(12) United States Patent
Greiner

(10) Patent No.: US 11,592,569 B2
(45) Date of Patent: Feb. 28, 2023

(54) LIDAR SYSTEM FOR DETECTING AN OBJECT

(71) Applicant: Robert Bosch GmbH, Stuttgart (DE)

(72) Inventor: Alexander Greiner, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 16/763,803

(22) PCT Filed: Dec. 5, 2018

(86) PCT No.: PCT/EP2018/083600
§ 371 (c)(1),
(2) Date: May 13, 2020

(87) PCT Pub. No.: WO2019/121004
PCT Pub. Date: Jun. 27, 2019

(65) Prior Publication Data
US 2020/0386865 A1 Dec. 10, 2020

(30) Foreign Application Priority Data
Dec. 22, 2017 (DE) .......................... 102017223673.6

(51) Int. Cl.
*G01S 17/89* (2020.01)
*G01S 7/481* (2006.01)
(Continued)

(52) U.S. Cl.
CPC .............. *G01S 17/89* (2013.01); *G01S 7/484* (2013.01); *G01S 7/4815* (2013.01);
(Continued)

(58) Field of Classification Search
CPC ......... G01B 11/25; G01S 17/42; G01S 17/87; G01S 17/89; G01S 17/894; G01S 7/4815;
(Continued)

(56) References Cited

U.S. PATENT DOCUMENTS 8,767,190 B2 7/2014 Hall
2010/0020306 A1* 1/2010 Hall ...................... H01S 5/0428
356/5.01

(Continued)

FOREIGN PATENT DOCUMENTS

DE 102004014041 A1 10/2005
DE 102011000978 A1 8/2012
(Continued)

OTHER PUBLICATIONS

International Search Report for PCT/EP2018/083600, dated Mar. 14, 2019.

*Primary Examiner* — Mohammed S Rahaman
(74) *Attorney, Agent, or Firm* — Norton Rose Fulbright US LLP; Gerard Messina

(57) ABSTRACT

A LIDAR system for detecting an object. The LIDAR system includes a rotor rotatable about a rotation axis, the rotor including at least two transceiver units, each having a detection area, the detection areas being oriented in different directions. Each of the at least two transceiver units includes a transmitting unit including at least one laser for emitting a laser beam into the detection area of the transceiver unit; and a receiving unit for receiving laser light which was reflected by the object in the detection area of the transceiver unit. At least one of the at least two transceiver units includes at least one beam duplication unit for duplicating the at least one laser beam into at least two duplication beams.

9 Claims, 2 Drawing Sheets

(51) Int. Cl.
*G01S 7/484* (2006.01)
*G01S 7/4865* (2020.01)
*G01S 17/894* (2020.01)

(52) U.S. Cl.
CPC .......... *G01S 7/4816* (2013.01); *G01S 7/4865* (2013.01); *G01S 17/894* (2020.01)

(58) Field of Classification Search
CPC ...... G01S 7/4816; G01S 7/4817; G01S 7/484; G01S 7/4865
See application file for complete search history.

(56) References Cited

U.S. PATENT DOCUMENTS

| 2014/0111812 | A1* | 4/2014 | Baeg ........................ G01S 17/87 |
| | | | 356/610 |
| 2015/0097947 | A1* | 4/2015 | Hudman ............ G02B 19/0057 |
| | | | 348/136 |
| 2016/0291137 | A1* | 10/2016 | Sakimura .............. G01S 7/4815 |
| 2017/0168162 | A1 | 6/2017 | Jungwirth |

FOREIGN PATENT DOCUMENTS

| DE | 102015105393 A1 | 10/2016 |
| WO | 2017193269 A1 | 11/2017 |

* cited by examiner

LIDAR SYSTEM FOR DETECTING AN OBJECT

FIELD

The present invention relates to a LIDAR system for detecting an object, to a working device and/or a vehicle, which is designed with a LIDAR system, and to a method for detecting an object using a LIDAR system.

BACKGROUND INFORMATION

German Patent Application No. DE 10 2004 014 041 A1 describes a sensor system for obstacle identification for ground vehicles and aircraft. Multiple multi-channel distance measuring systems operating according to the time-of-flight method are accommodated in a rotating head. The evaluation of the positions of obstacles is carried out by scanning using these multi-channel distance measuring systems.

SUMMARY

The present invention is directed to a LIDAR system for detecting an object. In accordance with an example embodiment of the present invention, the LIDAR system includes a rotor rotatable about a rotation axis, the rotor including at least two transceiver units, each having a detection area. The detection areas are oriented in different directions. Each of the at least two transceiver units includes a transmitting unit including at least one laser for emitting a laser beam into the detection area of the transceiver unit. Each of the at least two transceiver units includes a receiving unit for receiving laser light which was reflected by the object in the detection area of the transceiver unit.

According to the present invention, at least one of the at least two transceiver units includes a beam duplication unit for duplicating the at least one laser beam into at least two duplication beams.

A rotating system may be used to be able to detect objects in all directions using a single LIDAR system. With a vertical orientation of a rotation axis of the system, different light beams are able to scan different angular ranges. A detection area covers an angular range of polar coordinates circumferentially around the rotation axis. The rotor may include an inductive energy transmission unit. An inductive energy transmission takes place with the aid of adjoining coils. The energy transmission may take place in a contactless manner. In this way, sliding contacts and resulting vibrations during operation of the LIDAR system may be avoided.

In accordance with the example embodiment of the present invention, multiple transceiver units are used on a shared rotor to transmit a predefined number of duplication beams into different directions, in particular, into different angular ranges, and to receive their reflections. The obtained pieces of direction and distance information are subsequently combined into an overall image of the surroundings. A transmitting and receiving unit which transmits duplication beams into a detection area and receives their reflections from the detection area may be referred to as a transceiver unit. The transceiver unit may be referred to as a laser scanner. The transceiver unit may provide transmission points in time and times of flight of the light or the direction and distance from a detected object.

The LIDAR system may include a first number p of transceiver units. First number p is an integer, greater than or equal to 2. The transceiver units may be situated in a balanced arrangement around the rotation axis. In a balanced arrangement, an overall center of gravity of the rotor including the transceiver units and the periphery may fall on the rotation axis. The arrangement may be statically or statically and dynamically balanced. The transceiver units may be identical. The transceiver units may have the same design or the same structure. The transceiver units may be different from one another. The transceiver units may have a different design or a different structure.

Each of the at least two transceiver units may include a second number n of lasers. Second number n is an integer, greater than or equal to 1. A beam fan is formed as a result of the duplication of the at least one laser beam into the at least two duplication beams. A beam fan may be made of diverging duplication beams. The at least two duplication beams may be emitted at different angles with respect to the at least one laser beam. The different resolution planes form in one plane due to the angular distribution of the duplication beams. In this way, each of the at least two transceiver units of the LIDAR system may be increased in at least one plane. The at least one laser beam may be duplicated into a third number m of duplication beams. Third number m is an integer, greater than or equal to 2.

The resolution of the entire LIDAR system results based on first number p of transceiver units, based on second number n of lasers, and based on third number m of duplication beams. Due to different variations of these three values, an improved scalability of the LIDAR system may be achieved.

The laser light received with the aid of the receiving unit may be evaluated with the aid of common light propagation time methods. For this purpose, the LIDAR system may include a suitable evaluation unit. The evaluation unit may be designed to determine a light propagation time of the laser light which was emitted and received again. Such light propagation time methods include pulse methods, which determine the reception point of time of a reflected laser pulse, or phase methods, which emit an amplitude-modulated laser light and determine the phase offset with respect to the received laser light.

An advantage of the present invention is that the resolution may be increased in at least one plane. The resolution is achieved in the respective transmission path of each transceiver unit. The requirement with regard to the resolution in the particular reception path may be lower. Accordingly, a high aperture may be used in the reception path. A simple lens system may be used in the reception path. A simple lens system may be used in the transmission path. The requirements with regard to an optical filter of the LIDAR system may be kept low. Using the same second number n of lasers in at least one transmitting unit, it is possible to achieve a higher resolution than with a conventional transceiver unit. Using a lower second number n of lasers in at least one transmitting unit, it is possible to achieve the same resolution as with a conventional transceiver unit. Instead of using a second number n of lasers for a number of resolution planes, a single laser in the transmitting unit may suffice to implement the same number of resolution planes. In this way, it is possible to save a large number of further electronic components of the LIDAR system. In this way, the LIDAR system may be implemented more cost-effectively. The installation space of the LIDAR system may be reduced. The number of adjustment steps may be minimized.

The beam duplication unit may be designed to be transmitting or reflective.

In one advantageous embodiment of the present invention, it is provided that the detection areas are oriented at different angular positions with respect to the rotation axis. For this purpose, the transceiver units may be situated at least partially tilted or inclined with respect to a rotary plane of the rotor. A lens system of the transceiver units may also be obliquely situated within a housing of the transceiver unit. The advantage of this embodiment is that the angular ranges of the detection areas may complement one another to form an overall detection area due to the different angular positions.

In one further advantageous embodiment of the present invention, it is provided that the detection areas at least partially overlap. The advantage of this embodiment is that the overlapping areas are scanned frequently as a result of an overlap. When the light beams in the overlapping areas are oriented with an angular offset, the overlapping areas are scanned with an increased resolution. When the light beams in the overlapping areas do not have any angular offset, an increased scan rate results.

In one further advantageous embodiment of the present invention, it is provided that the detection areas do not overlap. The advantage of this embodiment is that, without overlap, the overall detection area of the LIDAR system is maximal.

In one further advantageous embodiment of the present invention, it is provided that at least one of the beam duplication units of at least one of the two transceiver units is furthermore designed to deflect the at least two duplication beams in a vertical direction and, additionally or alternatively, in a horizontal direction. A horizontal plane here shall be understood to mean any plane which is perpendicular to the direction of gravity. A vertical plane here shall be understood to mean any plane which is in parallel to the direction of gravity. The advantage of this embodiment is that the vertical resolution and, additionally or alternatively, the horizontal resolution of a LIDAR device may be increased. The increase in the resolution may be cost-effectively implemented in the process.

In one further advantageous embodiment of the present invention, it is provided that at least one of the beam duplication units in at least one of the two transmitting units is designed as a diffractive optical element. A diffractive optical element may be a diffraction grating, for example. A diffractive optical element may be a holographic optical element. Both phase-shifting (for example, phase gratings) and absorbing (for example, amplitude gratings) designs are possible. The at least two duplication beams arise due to interference at the diffractive optical element. The advantage of this embodiment is that the diffractive optical element enables good control over the vertical field of vision of the LIDAR system. The diffractive optical element may be easily and individually adapted to the requirements of the LIDAR system. For example, it is possible to control the angular distance and the intensity distribution across the angles by adapting the grating parameters (grating period, gap width, number of illuminated gaps). The angular distribution of the duplication beams may be adapted to the receiving unit of the particular transceiver units.

In one further advantageous embodiment of the present invention, it is provided that at least one of the beam duplication units in at least one of the two transceiver units is designed as a refractive optical element. The at least two duplication beams arise due to refraction at the refractive optical element. The advantage of this embodiment is that good control over the resolutions of the at least one plane is made possible.

In one further advantageous embodiment of the present invention, it is provided that the LIDAR system furthermore includes a control unit, which is designed to activate the at least one laser of a transceiver unit. The at least two transceiver units may be activatable temporally offset in the process. If at least one of the transceiver units includes at least two lasers, the at least two lasers may be activatable temporally offset. The control unit may furthermore be designed to activate further components of the LIDAR system. The control unit may be designed to activate the rotatable rotor.

An example working device and/or an example vehicle is/are also provided, which is and/or are designed with an above-described system. In particular, in a highly automated vehicle, a described LIDAR system may be of advantage for the highly automated driving functions. A described system may also be of advantage for the automated driving functions in a fully automated vehicle. For a highly automated or for a fully automated vehicle, a higher resolution in at least one plane results in enhanced identification of the surroundings of the vehicle.

In accordance with the present invention, an example method for detecting an object using a LIDAR system including a rotor rotatable about a rotation axis is also provided. The rotor includes at least two transceiver units having receiving areas oriented in different directions. The example method includes the step of activating the transmitting unit of the at least two transceiver units to each emit at least one laser beam into the detection area of the respective transceiver units. The method includes the further step of receiving laser light with the aid of a respective receiving unit of each of the at least two transceiver units. The laser light was reflected by the object in the detection area of the respective transceiver units. The method includes the further step of duplicating the at least one laser beam emitted by at least one of the at least two transceiver units into at least two duplication beams.

BRIEF DESCRIPTION OF THE DRAWINGS

One exemplary embodiment of the present invention is described in greater detail below based on the figures. Identical reference numerals in the figures indicate identical or identically operating elements.

DETAILED DESCRIPTION OF EXAMPLE EMBODIMENTS

Figure 1:
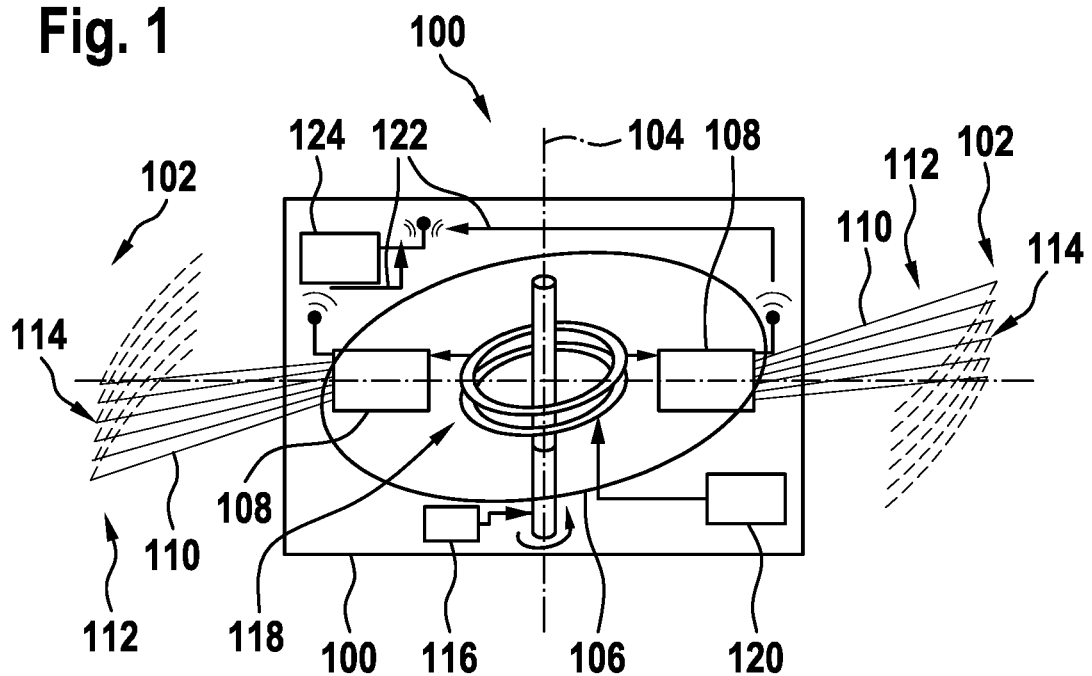
FIG. 1 shows a block diagram of a LIDAR system according to one exemplary embodiment.

FIG. 1 shows a block diagram of a LIDAR system 100 according to one exemplary embodiment of the present invention. LIDAR system 100 is designed to detect objects in an overall detection area 102 of 360°. For this purpose, LIDAR system 100 includes a rotor 106 mounted rotatably about a rotation axis 104. Rotor 106 is a sensor carrier and, in this exemplary embodiment, includes two diametrically opposed transceiver units 108.

This symmetrical arrangement is a balanced arrangement. Rotor 106 may include a different first number p of transceiver units 108 as a function of the requirements with regard to LIDAR system 100.

Transceiver units 108 are independent laser scanners. The transmitting unit of each of transceiver units 108 includes at least one laser for emitting a laser beam. Transceiver units 108 furthermore each include a beam duplication unit. The beam duplication unit duplicates the at least one laser beam into the duplication beams 110 (see also FIG. 3). Duplication beams 110 are each emitted as a beam fan 110 into a respective detection area 112. Beam fans 110 are oriented radially to rotation axis 104 and offset by 180° here. When duplication beams 110 impinge on an object, they project a line 114 of spots of light or strips of light onto the object. The strips of light may transition seamlessly into one another.

Duplication beams 110 of the two transceiver units 108 are oriented at different angles with respect to rotation axis 104 here. Duplication beams 110 are fanned equally wide. Duplication beams 110 are directed on different sides of a normal to rotation axis 104. In this way, the two detection areas 112 complement one another to form overall detection area 102 of LIDAR system 100.

Rotation axis 104 is illustrated in a vertical orientation here. Transceiver units 108 thus move in a horizontal rotation plane on a circular path. Line 114 of the light spots is vertically oriented here. The one beam fan 110 is directed above the rotation plane, the other beam fan 110 is directed below the rotation plane.

Rotor 106 is driven by a drive 116. In this way, duplication beams 110 rotate about LIDAR system 100. Overall detection area 102 is thus detected once per revolution. For example, rotor 106 may be rotated at up to 20 revolutions per second.

In one exemplary embodiment of the present invention, beam fans 110 are essentially oriented at the same angle with respect to rotation axis 104. Overall detection area 102 thus covers the same angle as beam fans 110. Overall detection area 102 is thus detected twice per revolution.

In one exemplary embodiment of the present invention, LIDAR system 100 includes a contactless energy transmission unit 118. Energy transmission unit 118 includes one fixed induction unit and one induction unit rotating with rotor 106. The induction units are spaced apart from one another by an air gap. The fixed induction unit is connected to an energy supply unit 120 of LIDAR system 100. The co-rotating induction unit is connected to transceiver units 108.

The laser beams are emitted in a pulsed manner and are scattered back or reflected when they impinge on an object. A distance between transceiver unit 108 and the object may be calculated with the aid of a time of flight between the emission and the reception. An angular position of rotor 106 at a point in time of the emission is known. In this way, a direction with respect to the object is also known. In one exemplary embodiment, these pieces of distance information 122 and pieces of direction information 122 are transmitted wirelessly to a control unit 124 of LIDAR system 100.

Pieces of information 122 are processed sequentially since associated horizontal angular ranges are not followed simultaneously, but consecutively. Due to a sequential transmission, pieces of information 122 are transmitted consecutively. In control unit 124, pieces of distance information 122 of individual transceiver units 108 are correlated via pieces of direction information 122. In this case, control unit 124 is designed as an evaluation unit of LIDAR system 100. As an alternative, LIDAR system 100 may also include a separate evaluation unit.

Figure 2:
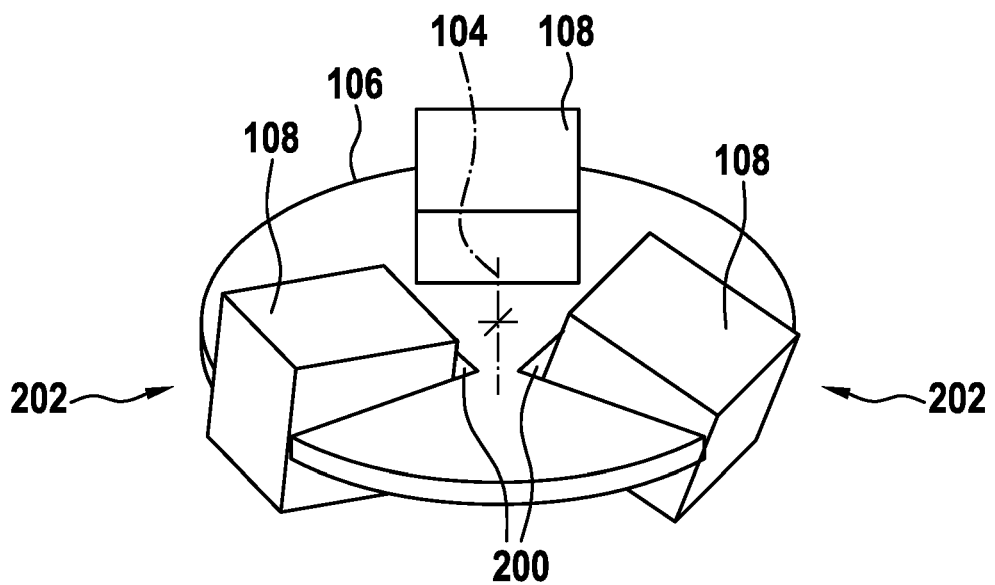
FIG. 2 shows a spatial representation of a rotor of a LIDAR system according to one exemplary embodiment.

FIG. 2 shows a spatial representation of a rotor 106 of a LIDAR system according to one exemplary embodiment. Rotor 106 essentially corresponds to the rotor in FIG. 1. In contrast, rotor 106 here includes three transceiver units 108. Transceiver units 108 are identical and situated azimuthally offset in each case by 120° from one another. Rotor 106 is a circular disk here, including three cut-outs 200 in which transceiver units 108 are situated. Transceiver units 108 are uniformly distributed along a circumference of the circular disk. This corresponds to an at least statically balanced arrangement since a center of gravity of rotor 106 and of transceiver units 108 coincides with rotation axis 104.

All electro-optical components may be situated on rotor 106. A detection area of up to 360° may be covered. Previously, it has been possible to cover the entire vertical area using a single LIDAR system 100.

Transceiver units 108 include a transceiver aperture 202. Transceiver aperture 202 faces away from rotation axis 104 in all transceiver units 108. In cut-outs 200, transceiver units 108 are situated partially tilted by an angle with respect to a plane of the circular disk, so that the detection areas not shown here are oriented in different angular positions with respect to rotation axis 104. One of transceiver units 108 is situated tilted upwardly here. One of transceiver units 108 is situated tilted downwardly. One of transceiver units 108 is situated not tilted. As a result of this arrangement, transceiver units 108 together cover an upper area, a middle area and a lower area of the overall detection area of the LIDAR system.

In other words, a transceiver unit 108 may be referred to as a sub-system or a sensor. As a result of the approach described here, it is possible to achieve a reduction in the requirements with regard to the angular resolution of each transceiver unit 108, using p transceiver units 108. It is possible to scan large angular ranges with high resolution and high frame rates.

The resolution of the entire LIDAR system results based on first number p of transceiver units 108, based on second number n of lasers, and based on third number m of duplication beams 110. In one exemplary embodiment, the LIDAR system includes three transceiver units 108. First number p is three here. If, for example, a vertical visual range of 27° is to be implemented in 180 resolution planes, the 180 resolution planes may be distributed among the three transceiver units 108. Each of the three transceiver units 108 may then resolve its respective 60 resolution planes with 9°. For example, each of the three transceiver units 108 includes one laser. Second number n is one. Furthermore, each of the three transceiver units 108 may include a respective beam duplication unit, which is able to duplicate a laser beam into three duplication beams. Third number m is three. In this way, the requirement for each transceiver unit 108 is reduced to 20 resolution planes with 3°.

The LIDAR system may also include more than three transceiver units 108, which are also distributed in a balanced arrangement on rotor 106. For example, five transceiver units 108 may each be situated offset by 72 degrees from one another, or nine transceiver units 108 may each be situated offset by 40 degrees from one another on rotor 106. As a result of a suitable selection of the vertical angular setting of p identical transceiver units 108, an increased resolution and/or an increased angular range or an increased frame rate may be achieved.

The LIDAR system may also be made up of p transceiver units 108, which cover the same angular range. Transceiver units 108 may also cover different vertical angular steps, i.e., for example, be offset by one resolution step. The resolution may thus be increased. When transceiver units 108 all cover the same angular range, the repetition rate and/or the functional safety of the system may be enhanced.

Figure 3:
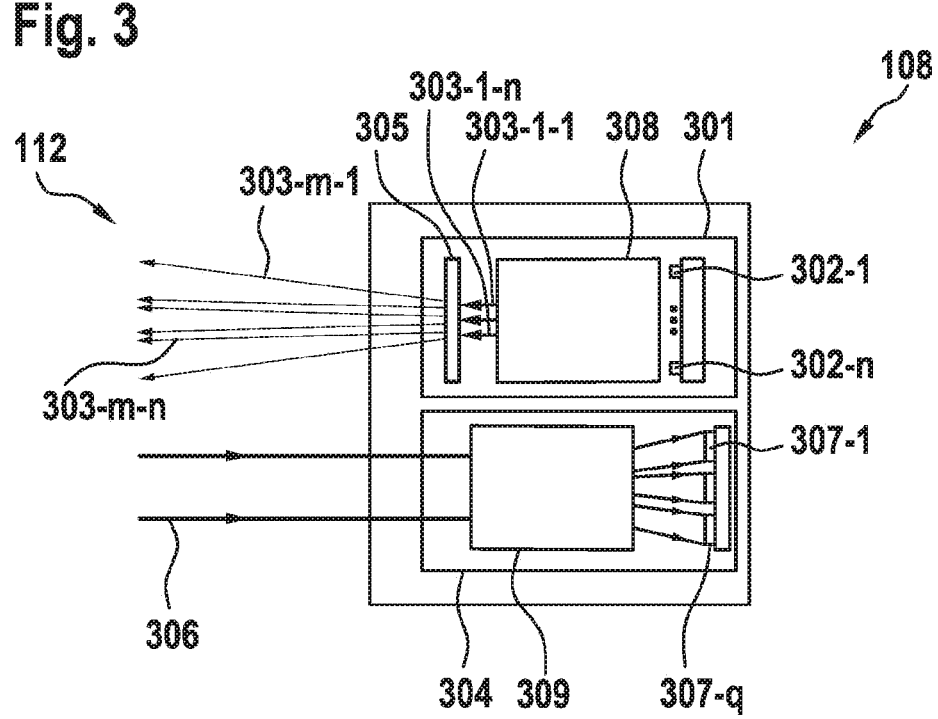
FIG. 3 shows a transceiver unit according to one exemplary embodiment.

FIG. 3 shows a transceiver unit 108 according to one exemplary embodiment. Transceiver unit 108 includes transmitting unit 301. Transmitting unit 301 includes laser unit 302. Laser unit 302 includes lasers 302-1 through 302-*n*. Lasers 302-1 through 302-*n* emit laser beams 303-1-1 through 303-1-*n*. Transmitting unit 301 may include optical elements 308 in the optical path of emitted laser beams 303-1-1 through 303-1-*n*. Such optical elements may be optical lenses, mirrors and the like, for example.

Transceiver unit 108 furthermore includes beam duplication unit 305. Beam duplication unit 305 may be designed as a diffractive optical element or as a refractive optical element. Laser beams 303-1-1 through 303-1-*n* impinge on beam duplication unit 305 and are duplicated into duplication beams 303-*m*-1 through 303-*m*-*n*. Laser beams 303-1-1 through 303-1-*n* may be duplicated in a horizontal plane in the process. Laser beams 303-1-1 through 303-1-*n* may be duplicated in a vertical plane in the process. If an object is situated in detection area 112, duplication beams 303-*m*-1 through 303-*m*-*n* may be scattered by the object. Duplication beams 303-*m*-1 through 303-*m*-*n* may be reflected by the object. Transceiver unit 108 furthermore includes receiving unit 304. Laser light 306 reflected by the object may be received with the aid of receiving unit 304. Receiving unit 304 may include optical elements 309 in the optical path of received laser light 306. Such optical elements may be optical lenses, mirrors and the like, for example. Received laser light 306 may impinge on detectors 307-1 through 307-*q*. The signals generated based on the received laser light may be evaluated with the aid of an evaluation unit, which is not shown here.

Figure 4:
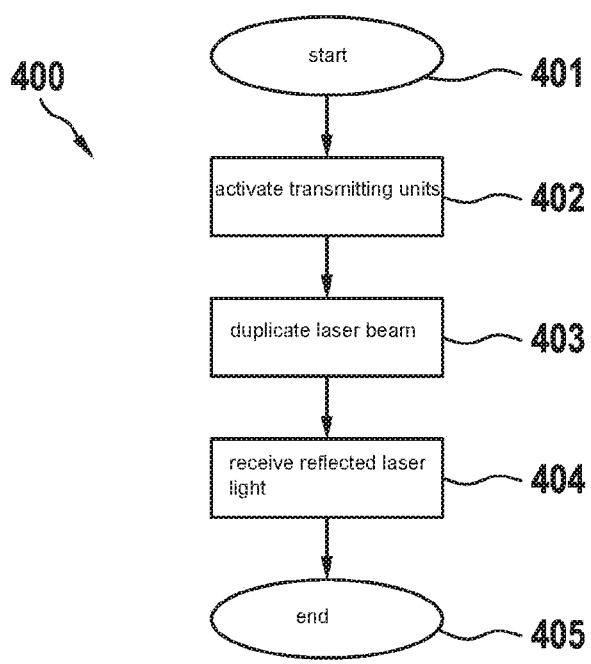
FIG. 4 shows a method for detecting an object using a LIDAR system according to one exemplary embodiment.

FIG. 4 shows method 400 for detecting an object, using a LIDAR system including a rotor rotatable about a rotation axis, the rotor including at least two transceiver units having detection areas oriented in different directions, according to one exemplary embodiment. Method 400 starts in step 401. In step 402, the transmitting units of the at least two transceiver units are activated to each emit at least one laser beam into the detection area of the particular transceiver units. In step 403, the at least one laser beam emitted by at least one of the at least two transceiver units is duplicated into at least two duplication beams. In step 404, laser light which was reflected by the object in the detection area of the particular transceiver units is received with the aid of a respective receiving unit of each of the at least two transceiver units. Method 400 ends in step 405.

What is claimed is:

1. A LIDAR system for detecting an object, comprising:
    a rotor rotatable about a rotation axis, the rotor including at least two transceiver units, each of the at least two transceiver units having a detection area, the detection areas being oriented in different directions, each of the at least two transceiver units including:
    a transmitting unit including at least one laser configured to emit a laser beam into the detection area of the transceiver unit; and
    a receiver configured to receive laser light reflected by the object in the detection area of the transceiver unit;
    wherein at least one of the at least two transceiver units includes at least one beam duplicator configured to duplicate the at least one laser beam into at least two duplication beams,
    wherein the at least two duplication beams are oriented at different angles with respect to the rotation axis and are directed on different sides of a normal to the rotation axis.

2. The LIDAR system as recited in claim 1, wherein the detection areas are oriented in different angular positions with respect to the rotation axis.

3. The LIDAR system as recited in claim 1, wherein the detection areas overlap at least partially.

4. The LIDAR system as recited in claim 1, wherein the detection areas do not overlap.

5. The LIDAR system as recited in claim 1, wherein at least one of the beam duplicator is configured to deflect the at least two duplication beams in a vertical direction and/or in a horizontal direction.

6. The LIDAR system as recited in claim 1, wherein at least one of the beam duplicator is a diffractive optical element.

7. The LIDAR system as recited in claim 1, wherein at least one of the beam duplicator is a refractive optical element.

8. A vehicle including a LIDAR system for detecting an object, the LIDAR system comprising:
    a rotor rotatable about a rotation axis, the rotor including at least two transceiver units, each of the at least two transceiver units having a detection area, the detection areas being oriented in different directions, each of the at least two transceiver units including:
    a transmitting unit including at least one laser configured to emit a laser beam into the detection area of the transceiver unit; and
    a receiver configured to receive laser light reflected by the object in the detection area of the transceiver unit;
    wherein at least one of the at least two transceiver units includes at least one beam duplicator configured to duplicate the at least one laser beam into at least two duplication beams,
    wherein the at least two duplication beams are oriented at different angles with respect to the rotation axis and are directed on different sides of a normal to the rotation axis.

9. A method for detecting an object, using a LIDAR system including a rotor rotatable about a rotation axis, the rotor including at least two transceiver units having detection areas oriented in different directions, the method comprising the following steps:
    activating the transmitting units of the at least two transceiver units to each emit at least one laser beam into the detection area of the respective transceiver unit;
    duplicating the at least one laser beam emitted by at least one of the at least two transceiver units into at least two duplication beams; and
    receiving laser light, using a respective receiver of each of the at least two transceiver units, which was reflected by the object in the detection area of the respective transceiver unit,
    wherein the at least two duplication beams are oriented at different angles with respect to the rotation axis and are directed on different sides of a normal to the rotation axis.

\* \* \* \* \*